(12) United States Patent
Kelley (10) Patent No.: US 6,307,475 B1
(45) Date of Patent: Oct. 23, 2001

(54) LOCATION METHOD AND SYSTEM FOR DETECTING MOVEMENT WITHIN A BUILDING

(76) Inventor: Eric D. Kelley, 10117 Whitepine La., Santee, CA (US) 92071

( * ) Notice: Subject to any disclaimer, the term of this patent is extended or adjusted under 35 U.S.C. 154(b) by 0 days.

(21) Appl. No.: 09/258,525

(22) Filed: Feb. 26, 1999

(51) Int. Cl.$^7$ .................................................. G08B 23/00
(52) U.S. Cl. ...................... 340/573.1; 340/552; 340/554; 340/567; 340/522; 340/506; 340/539
(58) Field of Search ................................ 340/573.1, 554, 340/552, 567, 522, 506, 539

(56) References Cited

U.S. PATENT DOCUMENTS

| | | | |
|---|---|---|---|
| 3,846,778 | * 11/1974 | Galvin et al. | ..................... 340/258 A |
| 3,967,283 | * 6/1976 | Clark et al. | ............................. 343/7.7 |
| 4,087,814 | * 5/1978 | Spirig | ................................. 343/5 PD |
| 4,275,390 | * 6/1981 | Heywang et al. | .................... 340/554 |
| 4,870,663 | 9/1989 | Kulju et al. . | |
| 5,150,099 | 9/1992 | Lienau . | |
| 5,448,501 | 9/1995 | Hablov et al. . | |
| 5,760,687 | 6/1998 | Cousy . | |
| 5,786,760 | 7/1998 | Suzuki et al. . | |
| 5,790,032 | * 8/1998 | Schmidt | ............................... 340/573 |
| 6,031,482 | * 2/2000 | Lemaitre et al. | ...................... 342/22 |

\* cited by examiner

*Primary Examiner*—Jeffery Hofsass
*Assistant Examiner*—Hung Nguyen
(74) *Attorney, Agent, or Firm*—Brown, Martin, Haller & McClain LLP (57) ABSTRACT

A system for detecting and tracking movement within a building has a plurality of portable microwave detector units for deploying outside the walls of the building. Each detector unit has a microwave module for transmitting microwaves through the building walls into a monitored area and for detecting radiation reflected back to the unit from the monitored area, and an output device for transmitting an alarm signal from the unit if a shift is detected in the reflected radiation frequency, indicating movement within the area. A receiver unit receives alarm signals from the detector units and produces an output signal for each detector unit currently detecting movement to provide the user with information on the location of any movement within the building.

14 Claims, 3 Drawing Sheets

LOCATION METHOD AND SYSTEM FOR DETECTING MOVEMENT WITHIN A BUILDING

BACKGROUND OF THE INVENTION

The present invention relates generally to alarm and warning systems, and is particularly concerned with a system and method for detecting and tracking movement within an enclosed space such as a building.

Conventional building alarm systems have the primary purpose of detecting an intruder and warning the owner or security agency of the presence of the intruder. These traditional systems simply look for an abnormal event and activate a warning device or transmit a warning signal to a remote station. The alarm system does not normally continue to check or monitor the space when already in the alarm state. These alarm systems are normally installed on the inside of buildings to protect the building or structure from intrusion.

One such conventional alarm system is described in U.S. Pat. No. 5,150,099 of Lineau, which describes a home security system for detecting stationary and moving objects within an area. The system transmits electromagnetic radiation into the monitored space, and senses the amplitude of radiation reflected or refracted off objects in the space. The information generated is compared with a pre-generated template, and the device produces an alarm condition if any variations are found. This system does not have any ability to track movement within a monitored space, but simply generates an alarm when a body not in the pre-generated template is detected.

U.S. Pat. No. 5,786,760 of Suzuki et al. describes an alarm system for both detecting the presence of an intruder, and for deterring the intruder by producing a variable, audible alarm or warning signal. The system utilizes plural transmitters of electromagnetic radiation located outside a building but within a fenced area. The radar system detects and monitors the position of an intruder within the outdoor fenced area, and outputs synthesized human or dog voice sounds at varying levels towards the intruder, so that it appears that the intruder is being approached. This system also does not provide any means for monitoring intruder position within an enclosed space.

U.S. Pat. No. 5,448,501 of Hablov et al. describes a detection system for building surveillance which uses a microwave transmitting/receiving device for radiating microwaves into an area and detecting and conditioning the reflected signal received as a result of individuals within the area. The system includes a method of identifying individuals within a building in order to distinguish authorized persons from unauthorized persons, but does not provide any means for tracking movements of intruders within a building.

Although current building alarm systems mounted within buildings can effectively detect a break-in or the like, they are of little or no help to law enforcement officers arriving on the scene where it is suspected that an intruder is still within the building. They are also of no help in situations where a gunman has barricaded himself within a building, with or without hostages. Therefore, there is a need for a system which would locate and monitor a living being from the exterior of a structure or building and track any movement of that being from region to region within the structure. This system would be particularly useful for police officers or SWAT teams in situations where a gunman has barricaded himself within a building, in some cases with hostages. Currently, officers are not able to determine the exact location of the suspect or suspects in the building, or monitor movement in the building. Internal surveillance cameras may not be present and, even if present, can be disabled by the suspect quite easily. An ability to locate the exact position of the or each suspect in such situations can considerably reduce the risk to both hostages and police officers when officers enter the building.

SUMMARY OF THE INVENTION

It is an object of the present invention to provide a new and improved method and system for detecting and tracking movement within a building or enclosed space.

According to one aspect of the present invention, a system for detecting and tracking movement within a building is provided, which comprises a plurality of portable electromagnetic radiation transmitter and detector units for deploying outside the walls of a building to be monitored, each unit having an transmitter for transmitting electromagnetic radiation through the building walls into a monitored area, a receiver for detecting radiation reflected back to the unit from the monitored area, and an output device for transmitting an alarm signal from the unit if a shift is detected in the reflected microwave energy, indicating movement within the area, and a receiver unit for receiving alarm signals from each of the transmitter/detector units and producing an output signal for each transmitter/detector unit currently detecting movement to provide the user with information on the location of any movement within the building.

In a preferred embodiment of the invention, the receiver unit has a plurality of alarm indicator lights such as LEDs on a front panel, each LED corresponding to a respective transmitter/detector unit. Law enforcement officers can deploy the transmitter/detector units around the building, and then monitor the receiver unit to detect which monitored space or room currently has movement, and can also monitor movement from room to room as LED lights go on and off.

The transmitter and detector in each transmitter/detector unit is preferably a Doppler microwave transmitter and detector placed in a housing which has all walls apart from a front window formed from a radar absorbing material to attenuate any microwave energy emanating out of or into the housing via the side and rear walls. This avoids any false indication of movement as a result of movement near the sides and rear of the unit, for example movement of officers deploying the unit outside the building. This arrangement allows the unit to be deployed in a hand-held mode, although transmitter/detector units may also be mounted on support stands or tripods for standing adjacent building walls.

This system takes advantage of the characteristic of microwave radiation to penetrate solid structures, and to reflect from objects back to its origin. If a frequency shift is detected in the microwave energy received at the detector, this indicates movement within the monitored area. In a preferred embodiment of the invention, at least two different types of transmitter/detector units are provided. A first, basic unit comprises a microwave transmitter and detector, and a relay unit or transmitter connected to the detector output. The second transmitter/detector unit has an encoder device and a radio transmitter, and is connected by hardwiring or radio to each of the first, basic units to receive the outputs from those units. The second type of transmitter/detector unit is set up to encode alarm signals from its own microwave receiver/detector, as well as alarm signals received from the first units to which it is connected on different channels, and provides an output data stream which is transmitted by the radio transmitter to the receiver unit, which decodes the data stream to determine which of the first and second units is currently detecting movement. This arrangement allows multiple detectors to send signals over a single radio frequency from a single transmitter. The number of first units which can be connected to a second transmitter/detector unit is dependent on the number of channels available on the encoder, minus one channel for the channel occupied by the detector unit of the second unit itself. If the second unit has an 8 channel encoder, eight different encoded signals can be transmitted over the same radio frequency, from up to seven attached basic units and the second or encoder unit itself.

According to another aspect of the present invention, a method of monitoring an enclosed space and tracking movement within the space is provided, which comprises the steps of:

placing a plurality of transmitter/detector units around the outside of the space to be monitored, each unit having an electromagnetic radiation transmitter for transmitting radiation into the adjacent area of the space to be monitored, and a detector for detecting radiation reflected back into the unit, and an output device for transmitting an alarm signal if a change in frequency in the radiation received by the detector is detected;

switching on the units to transmit electromagnetic radiation into a plurality of monitored areas within the space;

receiving alarm signals from the respective transmitter/detector units in at least one receiver unit;

decoding the received signals in the receiver unit to determine which of the transmitter/detector units are currently transmitting alarm signals; and activating a visual output device to indicate which of the transmitter/detector units are detecting movement at any time.

In a preferred embodiment of the invention, output alarm signals from a plurality of first transmitter/detector units are first transmitted to a second transmitter/detector unit which encodes signals based on the first unit from which they are received, and then transmits encoded signals to the receiver unit, allowing a single radio frequency to be used to transmit signals from multiple detectors. The operator can track movement within a building by monitoring the visual output of the receiver unit to see which unit is active at any one time, and which subsequent units become active. Thus, if an intruder moves from one room to another, the transmitter/detector unit which transmits into the first room will first emit an alarm signal, and the transmitter/detector unit monitoring the adjacent room will then emit an alarm signal.

The method and system of this invention allows a large number of portable transmitter/detector units to be deployed outside any building where intruders are known or suspected to be present. Thus, law enforcement officers can immediately determine whether movement is occurring in one or more rooms, and can readily track movement, so that they can determine the best time to enter the building. This will significantly reduce the risk to officers entering a building with absolutely no idea where the suspects are located. The units could be employed to ensure that no-one was behind or near a door where officers were planning to enter. The system could also be used to find suspects hiding in buildings, and in hostage situations to determine if a suspect moves away from the hostages, which would be a good time for the officers to enter. This system may also be useful in fire department rescue operations to determine locations of potential victims.

BRIEF DESCRIPTION OF THE DRAWINGS

The present invention will be better understood from the following detailed description of a preferred embodiment of the invention, taken in conjunction with the accompanying drawings in which like reference numerals refer to like parts and in which.

DESCRIPTION OF THE PREFERRED EMBODIMENT

Figure 1:
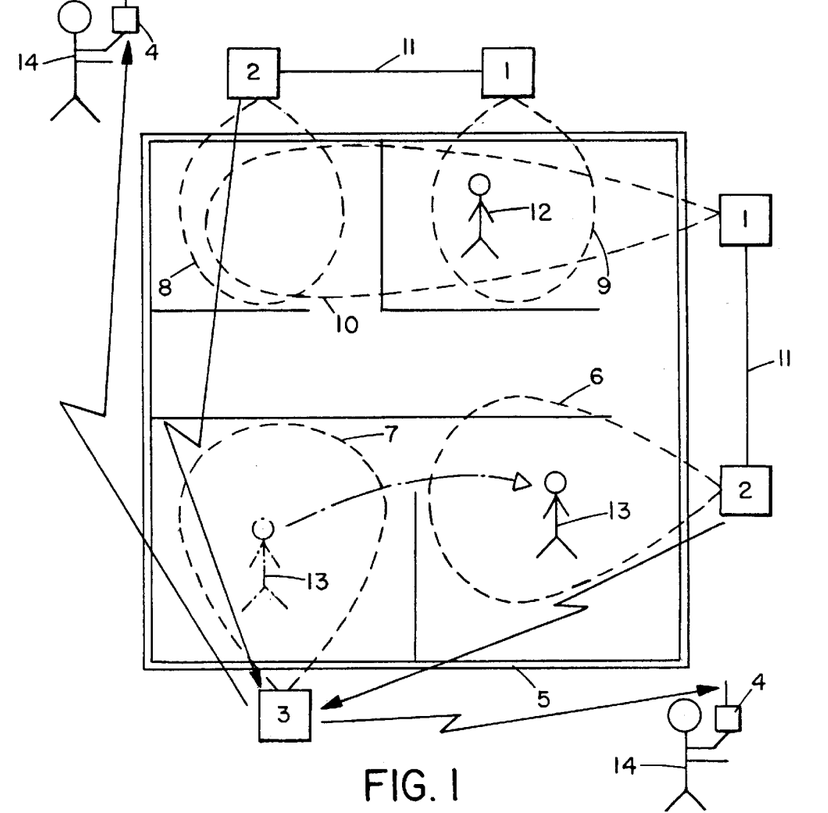
FIG. 1 is a schematic diagram of a location system and method for locating and tracking movement in a building according to a preferred embodiment of the present invention.

A location system according to a preferred embodiment of the present invention for locating and tracking movement within a building enclosed by a wall 5 is illustrated schematically in FIG. 1. In the illustrated example, two suspects 12,13 are located inside the building, while law enforcement officers 14 outside the building are monitoring the suspect's positions and movements. The system basically comprises a plurality of portable microwave detector units 1,2,3, and one or more hand-held receiver units 4 for receiving signals from the units 1,2,3.

Figure 2:
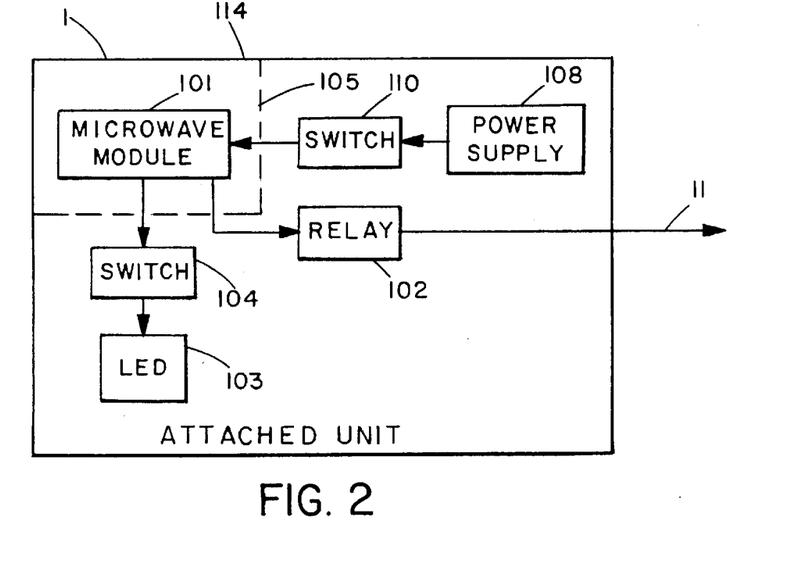
FIG. 2 is a block diagram of an attached unit forming part of the system of FIG. 1.
Figures 3, 4:
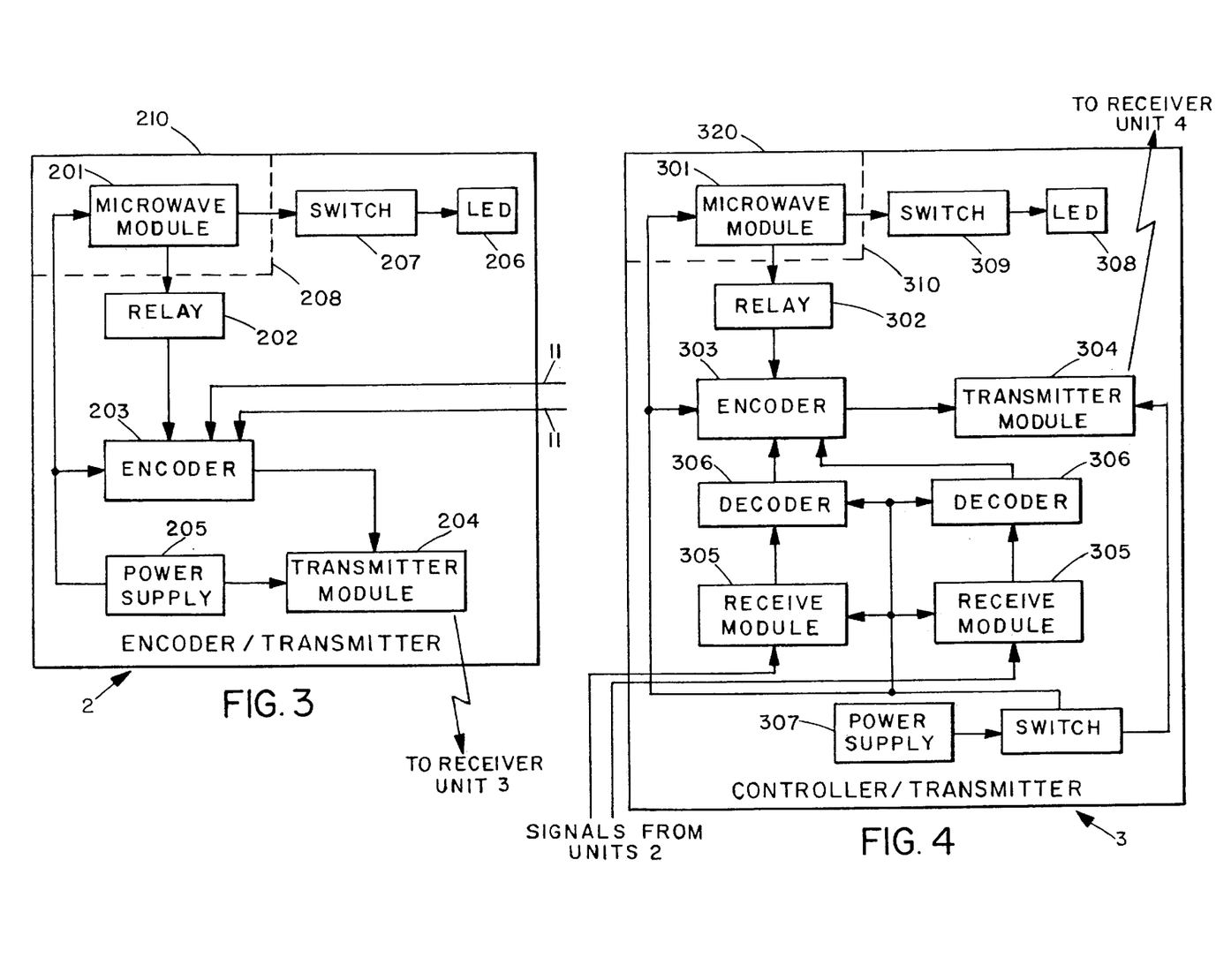
FIG. 3 is a block diagram of an encoder/transmitter unit forming part of the system of FIG. 1.
FIG. 4 is a block diagram of a controller/transmitter unit forming part of the system.

Each unit 1,2,3 transmits microwave radiation through the building wall 5 and into the interior of the building over a predetermined region 6,7,8,9 and 10. Each of the units 1,2,3 has a Doppler microwave module 101,201,301, as illustrated in FIGS. 2,3, and 4, respectively, which senses movement within its range. Such modules are available commercially at various powers. Low power microwave modules may be used for standard stucco-wood frame buildings, while higher power modules would be used for brick or concrete buildings. One suitable microwave module which may be used is the ADE Quest 2000 Microwave Motion Detector, which is sold by Bass Home Electronics of Hartford, Conn. Motion within the range of this detector is detected as a change in the frequency, and an indicator light on the module will flash at a rate proportional to the speed of the target.

In the preferred embodiment of the invention three different types of detector unit 1,2,3 are used in the system, which are illustrated in more detail in FIGS. 2,3 and 4, respectively. The first, basic detector unit 1, or attached unit, is illustrated in FIG. 2 and comprises a microwave module 101 as described above, which is connected via switch 104 to an indicator such as a light emitting diode, which is arranged to light up when a change in the received microwave frequency in module 101 is detected. A power supply 108 is connected to module 101 via a manually operable switch 110. The output of module 101 is connected via relay 102 to a line output 11 from the unit 1.

The entire unit is enclosed in an outer housing, and is small enough to be readily portable. The microwave module is surrounded on all sides apart from a window 114 in the front wall of the housing by walls 105 of radar absorbing material such as RF Foam produced by R&F Products of Carlsbad, Calif.

The microwave module 101 will transmit and receive microwave energy to and from the monitored space. When a change in received microwave frequency is detected, the module enters an alarm state and activates relay 102 to transmit an alarm signal on line 11. The microwave module automatically resets itself continuously to re-check the monitored space. A delay is built into the microwave module to stretch the alarm signal so that the relay 102 will only deactivate when no movement is detected over a specific period of time.

The second detector unit or decoder/transmitter unit 2 is illustrated in more detail in FIG. 3. As in the attached unit, unit 2 has a microwave module 201 which is identical to module 101 and is enclosed in a chamber surrounded by walls 208 of radar absorbing material such as RF foam, except for a window in front wall 210 for transmitting microwaves out of and into module 201. The output of module 201 is connected via switch 207 to an indicator such as an LED 206 which lights up in the event of an alarm signal. The output is also connected via relay 202 to an encoder device 203. An output of encoder device 203 is connected to a transmitter module 204. A power supply 205 is connected to the microwave module 201, the encoder device 203, and the transmitter module 204. The output lines 11 of one or more attached units 1 are also connected to the encoder device 203 in a decoder/transmitter unit 2. The connections between the attached units 1 and a decoder/transmitter unit 2 are preferably hardwire connections rather than wireless connections.

The microwave module 201 transmits and receives microwave energy to and from the monitored space. When in an alarm state, i.e. when a change in reflected microwave frequency is detected, the module 201 activates relay or switching transistor 202, which in turn activates a channel on the encoder integrated circuit or IC 203. Alarm signals received on lines 11 from attached units 1 also active separate, specific channels of the encoder IC 203. The encoder IC 203 encodes the channel data into on/off bits, combines it with unique address bits preset on the encoder IC, and forwards the bits to the transmitter 204. The transmitter then transmits a wireless signal carrying this data.

This arrangement permits multiple detector units to transmit encoded alarm signals over the same radio frequency. If encoder IC 203 has eight channels, it can be linked to up to seven basic or attached units 1. More than one encoder unit 2 can be provided with each unit transmitting signals from up to eight detector units over a specific frequency.

The third type of detector unit is a controller/transmitter unit 3, as illustrated in detail in FIG. 4. This unit has a microwave module 301 which is isolated from the remainder of the unit and from regions outside of the unit by walls 310 of radar absorbing material, which extend around all sides of the module 301 apart from a window 320 in the front wall which is of a material transparent to microwave radiation. Module 301 has a first output connected via switch 309 to an indicator light or LED 308 which will light up whenever the module is in an alarm state, as in units 1 and 2. A second output of module 301 is connected via relay or switching transistor 302 to an encoder IC 303 which operates in a similar fashion to the encoder IC 203 of unit 2. Incoming signals from encoder/transmitter units 2 are received in the unit 3 by receiver modules 305, one for each encoder/transmitter unit frequency, and are independently sent to decoder ICs 306, where they are decoded and forwarded to encoder IC 303. The output of encoder 303 is connected to transmitter module 304.

Alarm signals from module 301 will activate switching device 302, which in turn activates a channel on encoder IC 303, as in the unit 2. Incoming signals from units 2, which include alarm signals from the units 2 themselves as well as any alarm signals received from attached units 1, will be independently decoded by decoders 306 and forwarded to encoder 303, where they will activate separate channels of the encoder IC. The encoder IC 303 encodes all of the channel data into on/off bits, combines it with unique address bits preset on the encoder IC, and forwards the bits to transmitter module 304. The transmitter module 304 will transmit a wireless signal carrying all of the channel data, along with the unique address bits identifying the units 1,2, or 3 in which each set of data originated, to the receiver units 4.

Figure 5:
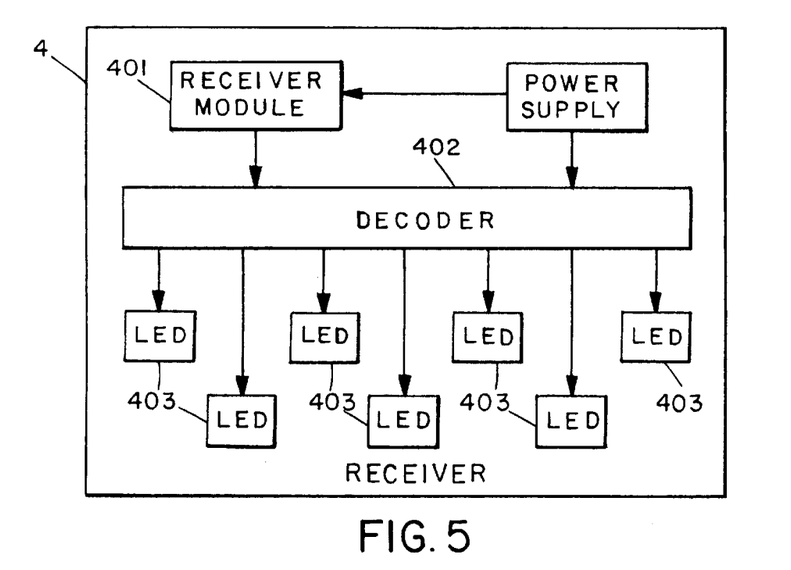
FIG. 5 is a block diagram of a receiver unit of the system of FIG. 1.
Figure 6:
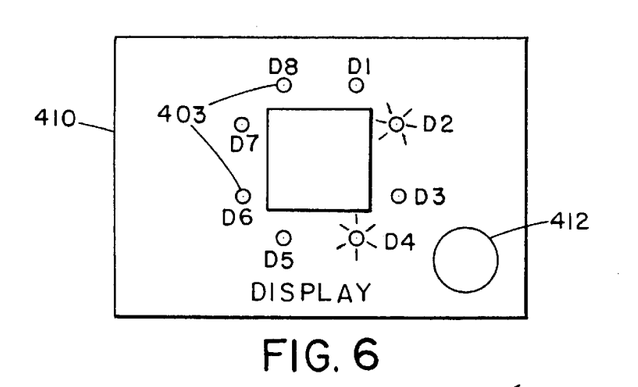
FIG. 6 is a top plan view of an output display provided on the receiver unit of FIG. 5.
Figure 7:
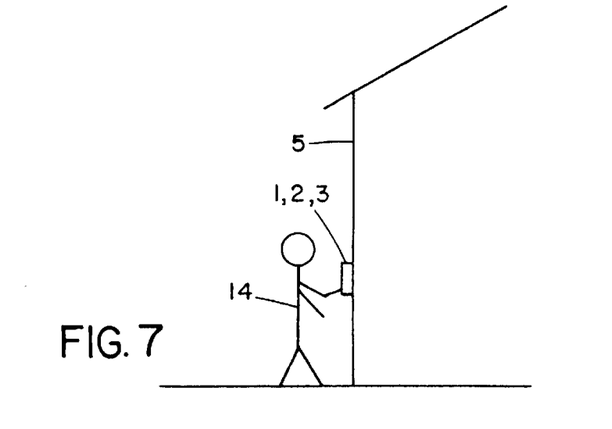
FIG. 7 is a schematic illustration of an officer using one of the units of FIG. 2,3, or 4 in the hand-held mode.

The receiver unit 4 is illustrated in more detail in FIG. 5, and is designed to receive signals at the frequency transmitted by encoder/transmitter units 3. Receiver unit 4 has a receiver module 401 which receives signals from units 3. The output of receiver module 401 is connected to a decoder 402 for decoding the input data. Decoder 402 has outputs connected to a suitable indicator device, such as a plurality of indicator lights or LEDs 403. The LEDs 403 are suitably provided on a front panel 410 of the receiver unit, as indicated in FIG. 6. Other output devices, such as a buzzer 412 or a vibratory output device, may be provided. The decoder output may also be connected as an input to other digital devices, for example to time stamp, count, and categorize each output signal for later analysis.

Each output LED 403 is associated with a specific one of the detector units 1,2, or 3, and will be numbered with a unique number so that the individual holding or monitoring the receiver unit can immediately determine which of the detector units 1,2,3 is currently detecting movement, or whether more than one unit is detecting movement at any time. In the illustrated embodiment, the units and LEDs are numbered D1 . . . DN.

In the illustrated embodiment, there is a hardwired connection 11 between the attached units 1 and an encoder/transmitter unit 2. Alternatively, a transmitter may also be provided in a plurality of units 1 to provide wireless communication from units 1 to one unit 2. Any suitably compatible transmitter and receiver modules may be used in the attached units 1 and encoder/transmitter units 2. In one specific example, each attached unit is provided with an LC-series transmitter of the type TXM- * * * -LC manufactured by Linx Technologies of Grants Pass, Oreg. A matching
LC-series receiver, such as a RXM- * * * -LC module as manufactured by Linx Technologies, will be provided in each encoder/transmitter unit 2, with an output connected to encoder 203.

Transmitter module 204 of the encoder/transmitter unit 2 is preferably also an LC-series transmitter, and the receiver modules 305 of the controller/transmitter unit 3 are matching LC-series receivers. Transmitter module 304 of the controller/transmitter unit is an RM-series transmitter, such as a LINX RM series transmitter manufactured by Linx Technologies. Receiver module 401 of the receiver unit 4 is a matching RM-series receiver, such as a LINX RM series receiver of Linx Technologies.

Any suitable encoder IC may be used in the encoder/transmitter units and controller/transmitter units. In one example, an HT640 encoder manufactured by Holtek Semiconductor, Inc. of Taiwan. A matching decoder will be used in controller/transmitter unit 3 and receiver unit 4, respectively, such as the Holtek HT-685 decoder.

A typical deployment of the system of this invention is illustrated in FIG. 1. It will be understood that, because each of the detector units and the receiver units has its own internal power supply or battery, they can be hand-held units, or readily portable units which can be placed anywhere around a building or enclosure 5 which is being monitored. Detector units 1,2,3 will be placed at spaced intervals around the periphery of the building, with the microwave transmitting front wall of the module 101,201, or 301 placed against the building wall 5 by an officer 14. Depending on the power of the microwave module, a microwave signal will be transmitted from each module through the building wall and into the inside of the building, covering a predetermined area 6,7,8,9, and 1 0, respectively, in the illustrated example. It can be seen that the monitored areas may overlap, as in the case of areas 8,9, and 10 in FIG. 1.

The radar absorbing material (RAM) which surrounds all sides of each module apart from the front of the module will ensure that the module only detects movement within the monitored area, and does not detect movement of the officer holding the unit, for example, or other movements in the area. The RAM shielding will ensure that only movement in front of the unit, i.e. within the building, will activate the alarm. Each of the detector units is provided with a pre-assigned, unique identification channel which is transmitted along with any alarm signal originating in that detector unit. Thus, when this signal is ultimately received in receiver unit 4, the decoder will be able to identify the detector unit from which it originated, and to light the associated LED 403. Suitable identification numbers will be provided adjacent the respective LEDs on the front panel 410 of each receiver unit, so that the operator immediately knows which particular deployed detector unit is active at any moment.

In the illustrated example, an intruder or suspect 13 within the building moves from monitored space 7 within a first room, into a monitored space 6 within an adjacent room. This will first cause the microwave module 301 in unit 3 to enter an alarm state, followed by the microwave module 201 in unit 2 monitoring space 6. Two lights will therefore light up successively on the or each receiver unit 4. Another suspect 1 2 in region 9 will activate the microwave module in unit 1, causing a corresponding LED to light up on the receiver unit front panel. The other lights will remain off. Thus, officers will immediately know exactly where the suspect or suspects are currently located, and can enter the building more safely than was previously possible.

The provision of three different types of detector unit in this system provides greater capacity and allows a larger number of detector units to be deployed. The simpler, attached units 1 can be provided in relatively large numbers and a plurality of these units can be connected to the same encoder/transmitter unit 2, either by means of a hardwired connection or by means of matching transmitters and receivers. This permits multiple detectors to signal over a single radio frequency from a single transmitter, rather than needing a large number of different transmitting frequencies, which could cause interference problems. The encoder/transmitter unit 2 can then transmit uniquely encoded signals to the controller/transmitter unit 3, which can correlate multiple encoded signals from the encoder/transmitter units 2, having one specific receive module 305 for receiving communications from each unit 2 in the system. In addition, multiple receiver units 4 can be provided with this system, so that multiple observers can track movement within a structure.

The microwave module power is sufficient to transmit signals through the type of building to be monitored. A lower power module will be provided in units for use with standard stucco-wood frame buildings, while higher power modules will be provided for units to be used in scanning brick or concrete buildings. The system of this invention can be deployed readily around any building or enclosed space where a suspect is believed to be located, and can provide extremely valuable and instantaneous information for law enforcement officers on the location of a suspect or suspects within the building. The units may be employed, for example, to ensure that no-one is behind or near a door or other opening through which officers are planning to make an entry.

The microwave modules may be provided with manual or remote range adjustability. This feature could be used to enable officers to pinpoint the location of a suspect more precisely. For example, if a suspect's movement is detected within a currently set range of a detector unit, an officer can slowly reduce the range until the suspect is no longer detected. The range setting at this point will give an idea of the distance between the suspect and the building wall through which the detector is directed.

Although a preferred embodiment of the invention has been described above by way of example only, it will be understood by those skilled in the field that modifications may be made to the disclosed embodiment without departing from the scope of the invention, which is defined by the appended claims.

I claim:

1. A system for detecting and tracking movement within a building, comprising:

a plurality of portable electromagnetic radiation detector units for deploying outside the walls of a building to be monitored;

each detector unit having a sensor module for transmitting electromagnetic radiation through the building walls into a monitored area and for detecting radiation reflected back to the unit from the monitored area, and an output device for transmitting an alarm signal from the unit if a shift is detected in the reflected radiation frequency, indicating movement within the area; and a receiver unit for receiving alarm signals from each of the detector units and producing an output signal for each detector unit currently detecting movement to provide the user with information on the location of any movement within the building.

2. The system as claimed in claim 1, including a housing enclosing each sensor module, the housing having a front wall, side walls, and a rear wall, the front wall comprising radar transmitting material, and the side walls and rear wall being of radar absorbing material, whereby radiation can be transmitted and received only through the front wall of the housing.

3. The system as claimed in claim 1, wherein the receiver unit has a front panel, and a plurality of alarm indicator lights on the front panel, each light corresponding to a respective detector unit.

4. The system as claimed in claim 3, further including a controller for associating each received output signal with a respective detector unit, and for actuating a respective indicator light associated with the respective detector unit in response to an alarm signal from that detector unit.

5. The system as claimed in claim 1, wherein each sensor module comprises a Doppler microwave transmitter and detector module.

6. The system as claimed in claim 1, including a plurality of first detector units and at least one second detector unit, each first detector unit comprising a sensor module and a transmitter for transmitting a unique output alarm signal to the second detector unit, and each second detector unit comprising a sensor module, a receiver for receiving output alarm signals from remotely positioned first detector units and from the second detector unit sensor module, and a transmitter for transmitting encoded alarm signals each having a code identifying the unit from which the alarm signal originated.

7. The system as claimed in claim 6, including a third detector unit having a third sensor module, at least one receiver module for receiving encoded alarm signals from the second detector unit, a decoder for decoding said alarm signals, an encoder for receiving said decoded alarm signals and alarm signals from the third sensor module, and a third transmitter module for transmitting said alarm signals to the receiver unit.

8. The system as claimed in claim 1, wherein each detector unit has an internal power supply.

9. The system as claimed in claim 1, wherein each detector unit is a hand-held, portable unit.

10. A method of monitoring an enclosed building and tracking movement within the building, comprising the steps of:

placing a plurality of detector units at spaced intervals around the outside of the walls of the building to be monitored, each unit having a sensor module comprising an electromagnetic radiation transmitter for transmitting radiation through the building walls into the area monitored, and a detector for detecting radiation reflected back into the unit, the detector unit also having an output device for transmitting an alarm signal from the unit if a change in frequency in the radiation received by the detector is detected as a result of movement in the monitored area located inside the building;

switching on the units to transmit electromagnetic radiation into a plurality of monitored areas within the building;

receiving alarm signals from the respective detector units in at least one receiver unit;

decoding the received signals in the receiver unit to determine which of the detector units are currently transmitting alarm signals; and activating a visual output device to indicate which detector unit is detecting movement at any time.

11. The method as claimed in claim 10, wherein the step of receiving alarm signals from the respective detector units comprises first receiving alarm signals from a plurality of first detector units at an encoder unit, encoding said signals based on the detector unit from which each signal is received, and transmitting said signals over a single radio frequency to the receiver unit.

12. The method as claimed in claim 11, including the steps of receiving encoded signals from a plurality of encoder units at a controller unit, and transmitting said encoded signals to said receiver unit.

13. The method as claimed in claim 10, wherein the step of placing the detector units around the outside of a space comprises holding the detector units against a building wall at spaced intervals around the periphery of the building.

14. The method as claimed in claim 10, including the step of shielding each sensor module on all sides except for a front side, and placing the detector unit with the front side of the sensor module against a building wall of a building to be monitored.

* * * * *

UNITED STATES PATENT AND TRADEMARK OFFICE
CERTIFICATE OF CORRECTION

PATENT NO.    : 6,307,475 B1
DATED         : October 23, 2001
INVENTOR(S)   : Kelley, Eric D.

It is certified that error appears in the above-identified patent and that said Letters Patent is hereby corrected as shown below:

Column 9,
Line 35, change "area monitores" to -- monitored area --.

Signed and Sealed this

Thirtieth Day of July, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO.     : 6,307,475 B1
DATED          : October 23, 2001
INVENTOR(S)    : Kelley, Eric D.

It is certified that error appears in the above-identified patent and that said Letters Patent is hereby corrected as shown below:

<u>Column 9,</u>
Line 35, change "area monitored" to -- monitored area --.

This certificate supercedes Certificate of Correction issued July 30, 2002.

Signed and Sealed this

Twelfth Day of November, 2002

Attest:

Attesting Officer

JAMES E. ROGAN
Director of the United States Patent and Trademark Office